(12) United States Patent
Liang et al.

(10) Patent No.: US 10,149,220 B2
(45) Date of Patent: Dec. 4, 2018

(54) METHOD FOR NOTIFYING AND OBTAINING UPLINK/DOWNLINK CONFIGURATION INFORMATION, BASE STATION, AND USER EQUIPMENT

(71) Applicant: ZTE CORPORATION, Shenzhen, Guangdong Province (CN)

(72) Inventors: Chunli Liang, Shenzhen (CN); Bo Dai, Shenzhen (CN); Shuqiang Xia, Shenzhen (CN); Peng Hao, Shenzhen (CN)

(73) Assignee: XI'AN ZHONGXING NEW SOFTWARE CO., LTD (CN)

( * ) Notice: Subject to any disclaimer, the term of this patent is extended or adjusted under 35 U.S.C. 154(b) by 121 days.

(21) Appl. No.: 14/907,045

(22) PCT Filed: May 8, 2014

(86) PCT No.: PCT/CN2014/077066
§ 371 (c)(1),
(2) Date: Jan. 22, 2016

(87) PCT Pub. No.: WO2014/173334
PCT Pub. Date: Oct. 30, 2014

(65) Prior Publication Data
US 2016/0192331 A1 Jun. 30, 2016

(30) Foreign Application Priority Data
Jul. 25, 2013 (CN) .......................... 2013 1 0316702

(51) Int. Cl.
*H04W 72/04* (2009.01)
*H04W 16/10* (2009.01)
(Continued)

(52) U.S. Cl.
CPC ........... *H04W 36/26* (2013.01); *H04L 5/0048* (2013.01); *H04L 5/0053* (2013.01);
(Continued)

(58) Field of Classification Search
CPC ... H04L 5/0048; H04L 5/1469; H04L 5/0053; H04W 72/042; H04W 16/04; H04W 36/26; H04W 24/10; H04W 36/18; H04W 16/10
See application file for complete search history.

(56) References Cited

U.S. PATENT DOCUMENTS

| | | | |
|---|---|---|---|
| 2010/0303013 A1 | 12/2010 | Khandekar et al. | |
| 2014/0029565 A1* | 1/2014 | Kim .................. | H04L 5/001 370/329 |
| 2016/0037492 A1* | 2/2016 | Xu ..................... | H04L 5/14 370/280 |

FOREIGN PATENT DOCUMENTS

| | | |
|---|---|---|
| CN | 102958058 A | 3/2013 |
| RU | 2011153796 A | 7/2013 |

(Continued)

OTHER PUBLICATIONS

Nokia Siemens Networks, Nokia et al: On signalling mechanisms to support dynamic TDD UL-DL reconfiguration, 3GPP TSG-RAN WG1 Meeting #73, Fukuoka, Japan, May 20-24, 2013, R1-132297.
Nokia Siemens Networks et al: Discussion on signalling for the indication of dynamic TDD UL/DL reconfiguration, 3GPP TSG-RAN WG1 Meeting #72 bis, Chicago, USA, Apr. 15-19, 2013, R1-131223.

(Continued)

*Primary Examiner* — Gbemileke J Onamuti
(74) *Attorney, Agent, or Firm* — Plumsea Law Group, LLC

(57) ABSTRACT

Disclosed is a method for notifying uplink and downlink configuration information. The method includes: a base station sending to a user equipment (UE) a downlink control information format, wherein the downlink control information format carries uplink and downlink configuration information used for indicating an uplink and downlink configuration.

15 Claims, 6 Drawing Sheets

(51) Int. Cl.
  *H04L 5/00* (2006.01)
  *H04W 36/26* (2009.01)
  *H04W 16/04* (2009.01)
  *H04L 5/14* (2006.01)
  *H04W 24/10* (2009.01)
  *H04W 36/18* (2009.01)

(52) U.S. Cl.
  CPC ........... *H04L 5/1469* (2013.01); *H04W 16/04* (2013.01); *H04W 16/10* (2013.01); *H04W 24/10* (2013.01); *H04W 36/18* (2013.01); *H04W 72/042* (2013.01)

(56) References Cited

FOREIGN PATENT DOCUMENTS

| WO | 2012113131 | A1 | 8/2012 |
|---|---|---|---|
| WO | 2012177037 | A2 | 12/2012 |
| WO | 2013042991 | A1 | 3/2013 |
| WO | 2013069218 | A1 | 5/2013 |

OTHER PUBLICATIONS

European Search Report dated Jun. 13, 2016 in European Patent Application No. 14788654.3.
"Discussion on reconfiguration signaling mechanisms for TDD UL-DL reconfiguration" sourced from Intel Corporation for discussion and decision at 3GPP TSG-RAN WG1 in Fukuoka, Japan, May 20-24, 2013.
Office Action dated Feb. 7, 2017 for Japanese Patent Application No. 2016-528309.
Office Action dated May 2, 2017 for Russian Patent Application No. 2016106197/07 and the English translation thereof.
International Search Report and Written Opinion dated Jul. 22, 2014 in PCT Patent Application No. PCT/CN2014/077066.
Panasonic. "Signalling mechanisms for TDD UL-DL reconfiguration", 3GPP TSG RAN WG1 Meeting #72bis, Chicago, USA, Apr. 15-19, 2013, R1-131326.
Catt, "Signalling mechanisms for TDD UL-DL re-configuration", 3GPP TSG RAN WG1 Meeting #73, Fukuoka, Japan, May 20-24, 2013, R1-131882.

* cited by examiner

METHOD FOR NOTIFYING AND OBTAINING UPLINK/DOWNLINK CONFIGURATION INFORMATION, BASE STATION, AND USER EQUIPMENT

CROSS-REFERENCE TO RELATED APPLICATION(S)

This application is the U.S. National Phase application of PCT application number PCT/CN2014/077066 having a PCT filing date of May 8, 2014, which claims priority of Chinese patent application 201310316702.6 filed on Jul. 25, 2013, the disclosures of which are hereby incorporated by reference.

TECHNICAL FIELD

The present document relates to the field of mobile communications, and more particularly, to a method for notifying and obtaining uplink and downlink configuration information, as well as a base station and a user equipment.

BACKGROUND OF RELATED ART

The Time Division Duplex (TDD) system divides uplink (sent by a terminal to a base station) and downlink (sent by a base station to a terminal) resources in the time domain, and usually performs uplink and downlink resource allocation by taking a time slot or subframe as the unit. Under normal circumstances, the base station uses a broadcast signaling to notify all terminals within a cell of the uplink and downlink resource allocation situation in the semi-static manner.

For example, FIG. 1 shows a frame structure (also called the second type of frame structure, i.e. the frame structure type 2) of a TDD mode in the Long Term Evolution (LTE) system. In the frame structure, one 10 ms (i.e. 307200 Ts, Ts is the sampling interval, and 1 Ts=1/30720000 sec) radio frame is divided into two half-frames, and the length of each half-frame is 5 milliseconds (i.e. 5 ms). Each half-frame contains five 1 ms subframes. The role of each subframe is as shown in Table, wherein D represents a downlink subframe used for transmitting the downlink signal. U represents an uplink subframe used for transmitting the uplink signal. One uplink or downlink subframe is divided into two 0.5 ms time slots. S represents a special subframe containing three special time slots, namely DwPTS (Downlink Pilot Time Slot, used for transmitting downlink signals), GP (Guard Period) and UpPTS (Uplink Pilot Time Slot, used for transmitting uplink signals).

TABLE 1

LTE uplink and downlink configuration

| Config-uration | Switching point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The Orthogonal Frequency Division Multiplexing (OFDM) technology is used in the downlink of the LTE system, and the Single Carrier-Frequency Division Multiple Access (SC-FDMA) technology (or called the DFT Spread-OFDM technology) is used in the uplink thereof. In the normal Cyclic Prefix (CP) condition, a time slot consists of 7 OFDM symbols or SC-FDMA symbols. In the extended CP (Extended cyclic prefix) condition, a time slot consists of 6 OFDM symbols or SC-FDMA symbols. FIG. 2 takes the normal CP for example and provides a schematic diagram of a downlink subframe. Wherein, the bandwidth of one RE (Resource Element) is 15 kHz, and occupies one OFDM or SC-FDMA symbol in the time domain. One RB (Resource Block) occupies 12 REs in the frequency domain and occupies one time slot in the time domain.

The LTE system transmits the downlink data services through the Physical Downlink Shared CHannel (PDSCH), and transmits the uplink data services through the Physical Uplink Shared CHannel (PUSCH). In addition, the LTE physical layer also contains some control channels used for assisting in the uplink and downlink data transmission. For example:

An PDCCH (Physical Downlink Control Channel) or EPDCCH (Enhanced Physical Downlink Control Channel) is used for carrying the following control information:

uplink scheduling signaling (such as a Downlink Control Information (DCI) format 0/4). The signaling is used to indicate the terminal information such as the uplink resource allocation situation, and the modulation and coding scheme of the transport block, and so on;

downlink scheduling signaling (such as a DCI format 1/1A/1B/1C/1D/2/2A/2B/2C/2D). The signaling is used to indicate the terminal information such as the downlink resource allocation situation, and the modulation and coding scheme of the transport block, and so on;

uplink power control signaling (such as a DCI format 3/3A). The signaling is used to indicate the terminal the adjustment situation of uplink transmit power An PHICH (Physical Hybrid ARQ Indicator CHannel) is used to indicate whether the uplink data transmission result is correct.

Each downlink control message is finally transmitted in the PDCCH in the form of one or more CCEs (Control Channel Elements) after going through processes of the CRC (Cyclic Redundancy Check) addition, channel coding, and rate matching and so on. Wherein, during the CRC addition, it also needs to further use the corresponding RNTI to scramble the CRC.

The physical resources transmitted in the physical downlink control channel are the control channel elements (CCEs), the size of a CCE is nine Resource Element Groups (REGs), i.e., 36 Resource Elements (REs), and one PDCCH may occupy 1, 2, 4 or 8 CCEs. The four types of PDCCHs that occupy 1, 2, 4 and 8 CCEs use the tree Aggregation, that is, the PDCCH occupying one CCE may start from any CCE position, the PDCCH occupying two CCEs starts from an even-numbered CCE position, the PDCCH occupying four CCEs starts from a CCE position that is an integer multiple of 4, and the PDCCH occupying 8 CCEs starts from a CCE position that is an integer multiple of 8. In one radio frame, if the normal Cyclic Prefix (CP) is used, the first one to three OFDM symbols of the first time slot of each subframe can bear physical resources of the PDCCH, and the remaining symbols can bear physical resources of the Physical Downlink Shared Channel (PDSCH).

For each Aggregation Level, the standard defines a Search Space including a Common search space and UE-specific search spaces. The number of CCEs in the entire search space is determined by the number of OFDM symbols occupied by the control region indicated by the PCFICH in each downlink subframe and the number of PHICH groups. The UE performs the blind detection on all possible PDCCH code rates in the search space in accordance with the DCI format of the transmission mode.

In the LTE system, the uplink and downlink data transmission and its corresponding control signaling have a certain timing sequence relationship. The scheduling signaling of the PDSCH and the PDSCH are transmitted in the same subframe (assumed as a subframe n), the feedback signaling (ACK/NACK, used for indicating whether the data are transmitted correctly) of the PDSCH is transmitted in the subframe n+k after the PDSCH. The PUSCH is transmitted in the subframe m, the scheduling signaling of the PUSCH is transmitted in the previous subframe m−p, and the feedback signaling (ACK/NACK) is transmitted in the latter subframe m+q.

In some wireless communication scenarios, the uplink and downlink service changes in the base station serving area are very dramatic. For example, in some small cells or home environments, the number of users served by one base station is very small, the system load is relatively low, the proportions of uplink and downlink data amounts in the serving area change rapidly. Under such conditions, semi-statically allocating the uplink and downlink resources of the TDD system affects the resource allocation efficiency. Under this background, the LTE R12 release introduces the dynamic uplink and downlink configuration adjustment function to the TDD mode. But how the base station quickly notifies the terminal of the uplink and downlink configuration used by the current cell is still a problem to be solved.

SUMMARY OF THE INVENTION

The technical problem required to be solved in the present document is to provide a method for notifying and obtaining uplink and downlink configuration information, as well as a base station and a user equipment, to solve the existing problem that a terminal cannot be quickly notified of an uplink and downlink configuration.

In order to solve the abovementioned technical problem, the present document provides a method for notifying uplink and downlink configuration information, which comprises:

a base station sending to a user equipment (UE) a downlink control information format, wherein the downlink control information format carries uplink and downlink configuration information used for indicating an uplink and downlink configuration.

Preferably, before sending the downlink control information format, the base station is further used to configure a radio network temporary identifier (RNTI), and the base station configures a plurality of UEs with same or different uplink and downlink configuration-specific RNTIs.

Preferably, the base station notifies the UE to perform uplink and downlink configuration information detection based on the RNTI in one of the following ways:

notifying through an upper layer signaling;
configuring a UE-specific transmission mode;
activating the UE to enter a dynamic uplink and downlink configuration adjustment mode.

Preferably, the downlink control information format comprises a plurality of control fields, wherein at least one control field is used for carrying the uplink and downlink configuration information.

Preferably, each control field indicates one uplink and downlink configuration.

Preferably, at least one control field in the downlink control information format is used for indicating existing control information or used for indicating newly-added control information or set as a predefined value.

Alternatively, a position of the uplink and downlink configuration information in the downlink control information format refers to an index value of a control field in the downlink control information format.

Preferably, the base station configures a plurality of UEs with same or different index values of control fields.

Preferably, the uplink and downlink configuration information is at least one of the following:

uplink and downlink configuration information of one or more serving cells of the UE;

uplink and downlink configuration information of one or more transport nodes within a serving cell of the UE;

uplink and downlink configuration information of neighbor serving cells of the serving cell of the UE.

Preferably, in a carrier aggregation system:

uplink and downlink configuration information of all serving cells participating in an aggregation is borne in a same downlink control information format, and is transmitted via a physical downlink control channel of a primary serving cell;

or, uplink and downlink configuration information of all serving cells participating in an aggregation is respectively borne in different downlink control information formats, and is transmitted through a physical downlink control channel corresponding to each serving cell;

or, uplink and downlink configuration information of all serving cells participating in an aggregation is borne in a predefined downlink control information format, and is transmitted in a predefined physical downlink control channel.

Preferably, the position of the uplink and downlink configuration information in the downlink control information format is determined in any one of the following ways:

determined through an upper layer signaling; or determined in a predefined way; or determined based on a mapping relationship with an index of a serving cell; or determined based on a mapping relationship with a carrier indication control field (CIF); or determined based on a mapping relationship with a configuration parameter of a reference signal used for acquiring channel state information (CSI-RS-Config); or determined based on a mapping relationship with a quasi co-location (QCL) configuration parameter.

Preferably, the position of the uplink and downlink configuration information in the downlink control information format refers to an index value of a control field in the downlink control information format.

Preferably, the base station configures a plurality of UEs with same or different index values of control fields.

Preferably, the base station sends the downlink control information format through a physical downlink control channel, the physical downlink control channel is transmitted in a common search space; or transmitted in a common search space and a specific search space; or transmitted in a common search space of a primary serving cell in a carrier aggregation system; or transmitted in a specific search space corresponding to each serving cell and the common search space of the primary serving cell.

In order to solve the abovementioned technical problem, the present document further provides a method for obtaining uplink and downlink configuration information, which comprises:

a user equipment (UE) performing a blind detection on a physical downlink control channel in a candidate search space, and obtaining a downlink control information format, wherein the downlink control information format carries uplink and downlink configuration information used for indicating an uplink and downlink configuration;

the UE extracting the uplink and downlink configuration information based on a position of the uplink and downlink configuration information in the downlink control information format.

Alternatively, the position of the uplink and downlink configuration information in the downlink control information format is determined in at least one of the following ways:

determined through an upper layer signaling; or determined in a predefined way; or determined based on a mapping relationship with an index of a serving cell; or determined based on a mapping relationship with a carrier indication control field (CIF); or determined based on a mapping relationship with a configuration parameter of a reference signal used for acquiring channel state information (CSI-RS-Config).

Preferably, the position of the uplink and downlink configuration information in the downlink control information format refers to an index value of a control field in the downlink control information format.

In order to solve the abovementioned technical problem, the present document further provides a base station, which comprises:

a control information transmission module, configured to: send to a user equipment (UE) a downlink control information format, wherein the downlink control information format carries uplink and downlink configuration information used for indicating an uplink and downlink configuration.

In order to solve the abovementioned technical problem, the present document further provides a user equipment, which comprises:

a blind detection module, configured to: perform a blind detection on a physical downlink control channel in a candidate search space, and obtain a downlink control information format, wherein the downlink control information format carries uplink and downlink configuration information used for indicating an uplink and downlink configuration;

an information extraction module, configured to: extract the uplink and downlink configuration information based on a position of the uplink and downlink configuration information in the downlink control information format.

With the method for notifying and obtaining the uplink and downlink configuration information, as well as the base station and the user equipment in the embodiments of the present document, the downlink control information format is used to carry the uplink and downlink configuration information used for indicating the uplink and downlink configuration, which achieves the purpose of quickly notifying the terminal of the uplink and downlink configuration used by the present cell without taking up extra physical layer resources, and has small delay and does not have the ambiguity problem.

PREFERRED EMBODIMENTS OF THE INVENTION

Through research, the inventors found that, the cycle of upper layer signalings such as SIB (System Information Block)/RRC (Radio Resource Control)/MAC (Medium Access Control) is relatively long, the delay is long, and there is a problem of ambiguity that the user equipment and the base station have inconsistent understanding on the time point of performing the signaling, which cannot meet the requirements of uplink and downlink dynamic reconfiguration. The main advantage of notifying the uplink and downlink configuration via the physical layer signaling is small delay and without the problem of ambiguity. But using the physical layer signaling also has some disadvantages: it is required to occupy additional physical layer resources, and physical layer control signaling overheads are increased.

In view of this, the present document provides a new method for notifying uplink and downlink configuration information as well as a new method for obtaining uplink and downlink configuration information, wherein, a downlink control information format is used to carry the uplink and downlink configuration information used for indicating an uplink and downlink configuration.

Hereinafter, in conjunction with the accompanying drawings, the technical solution of the present document will be further described in detail. It should be noted that, in the case of no conflict, the embodiments of the present application and the features in the embodiments may be arbitrarily combined with each other.

Embodiment 1

Figure 1:
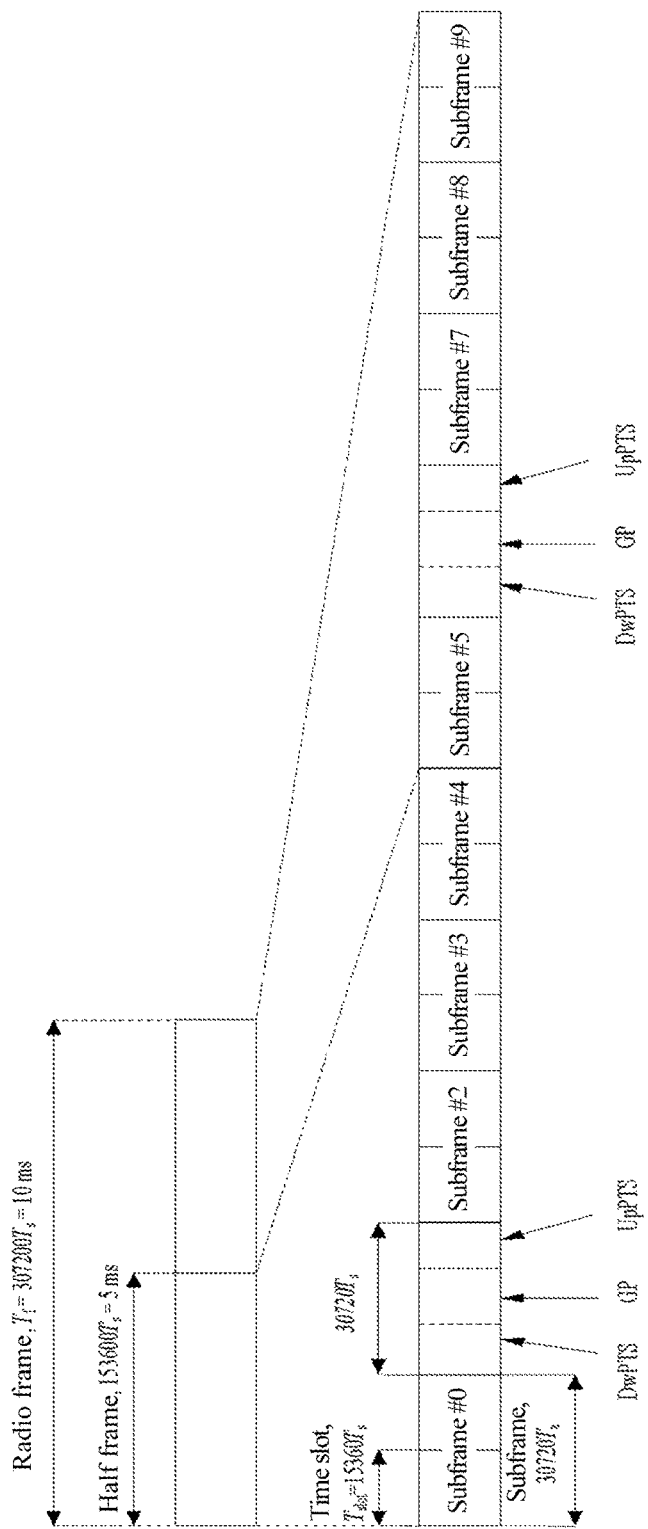
FIG. 1 is a schematic diagram of a frame structure type 2 in the LTE system.
Figure 2:
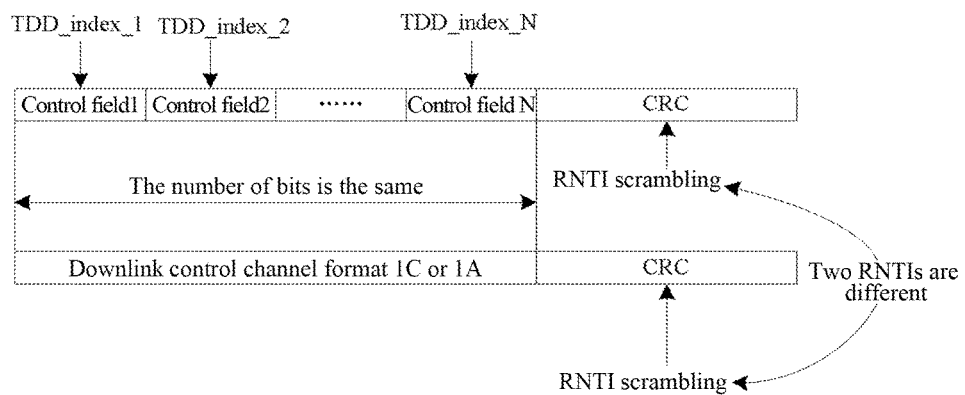
FIG. 2 is a schematic diagram in accordance with an embodiment of the present document.

For a UE having the dynamic uplink and downlink configuration adjustment function, a base station configures a specific RNTI (Radio Network Temporary Identifier) recorded as a TDD-RNTI through an upper layer signaling, and the configured TDD-RNTI and all the existing RNTIs configured for the UE are all different:

In the present embodiment, a downlink control information format that has the same number of bits included in the existing downlink control information format 1A or 1C is used to borne the uplink and downlink configuration information, and it is called a downlink control information format 1E in the present embodiment, as shown in FIG. 2, the information bits contained in the downlink control information format transmitted by the base station are all used to indicate the uplink and downlink configuration information; taking into account that there are a total of seven uplink and downlink configurations supported in the existing TDD system, therefore, every 3 bits can be a group and respectively indicate one uplink and downlink configuration; because the number of bits contained in the downlink control information format 1A or 1C is not an integral multiple of 3 in some bandwidth configurations, the remaining bits (fewer than 3 bits) are reserved. Meanwhile, in this form, the base station also configures the UE with an index value, which is used for indicating the user equipment to obtain the uplink and downlink configuration information in which control field in the downlink control information format, and recorded as TDD-index here;

the index value of the control field in the present embodiment is a concrete manifestation used for indicating the position of the uplink and downlink configuration information in the downlink control information format.

Specifically, it can be determined through an upper layer signaling; or determined in a predefined way; or determined based on a mapping relationship with an index of the serving cell; or determined based on a mapping relationship with a carrier indication control field (CIF); or determined based on a mapping relationship with the CSI-RS-Config upper layer configuration parameters.

Specifically, when it is determined through the upper layer signaling, the base station configures a plurality of UE with same or different index values of control fields.

When receiving, based on the number of bits included in the downlink control information format 1E, the UE performs a blind detection on the physical downlink control channel in the candidate search space to obtain the decoded downlink control information including the CRC, and then performs descrambling and CRC check on the CRC based on the RNTI configured by the base station and used to detect the downlink configuration information, and if the CRC check is passed, then further finds a control field corresponding to the TDD-index from the decoded downlink control information format based on the TDD-index configured by the upper layer, thereby obtaining the corresponding uplink and downlink configuration information.

As can be seen from the present embodiment that, the number of bits included in the downlink control information format 1E that carries the uplink and downlink configuration information can be the same as that in the downlink control information format 1A or the downlink control information format 1C. The only difference between the two parties is that, because the numbers of bits contained in the downlink control information formats 1A and 1C are different, the capabilities of carrying the control information are also different, correspondingly, the detection performances of the downlink control information formats are also different. Under the premise of the same aggregation level, the smaller the number of bits contained in the downlink control information format is, the better the detection performance is. Therefore, when determining the number of bits contained in the downlink control information format that carries the uplink and downlink configuration information, it needs to take a compromise between the carrying capability and the detection performance.

Embodiment 2

On the basis of the embodiment 1, if the base station configures a plurality of UEs with the same dynamic uplink and downlink configuration adjustment specific RNTI, as well as the same TDD-index, then the uplink and downlink configurations of the plurality of UEs are the same, thus configuring a UE group with the same uplink and downlink configuration is realized.

Embodiment 3

On the basis of the embodiment 2, if a plurality of UE groups exist, these UE groups can be configured with the same dynamic uplink and downlink configuration adjustment specific RNTI, but different UE groups are configured with different TDD-indexes, thus one downlink control information format carrying the uplink and downlink configuration information of multiple UE groups can be achieved, and compared with the way that one downlink control information format can only carry the uplink and downlink configuration information of one UE or one UE group, the overhead of the physical downlink control channel can be greatly reduced in this way.

Embodiment 4

For UEs having both the dynamic uplink and downlink configuration adjustment capability and the carrier aggregation capability, the base station configures that these two functions of the UEs are simultaneously enabled.

Figure 3:
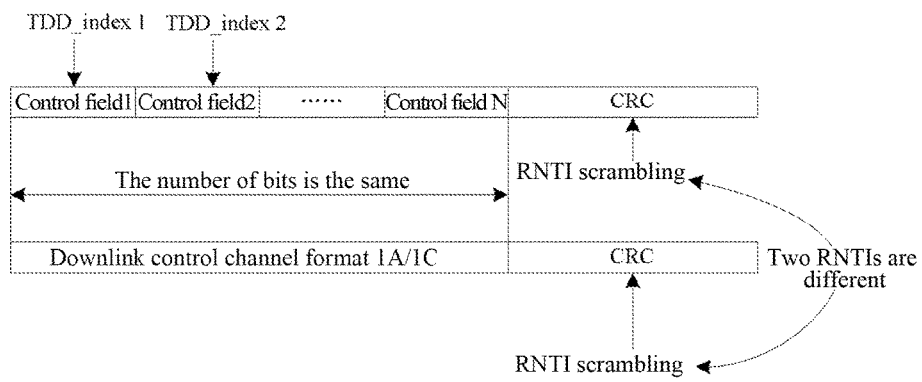
FIG. 3 is another schematic diagram in accordance with an embodiment of the present document.

When the UE has serving cells with the same uplink and downlink configuration in the aggregation, the uplink and downlink configurations of the primary serving cell and the secondary serving cell are the same, at this time, the way in the embodiment 1 can be used, the base station configures the UE with an index value that is used to indicate the UE to obtain the uplink and downlink configuration information in which control field in the downlink control message format, the uplink and downlink configuration information is applicable to all the serving cells participating in the aggregation. Moreover, when the UE has serving cells with different uplink and downlink configurations in the aggregation, the uplink and downlink configuration of each serving cell participating in the aggregation may be different, at this time, the base station configures the UE with multiple index values respectively used for indicating the UE to obtain the uplink and downlink configuration information corresponding to each serving cell in which control fields in the downlink control information format. Alternatively, the base station and the UE agree on a mapping relationship between the serving cell index and the control field index, the UE determines to obtain the uplink and downlink configuration information corresponding to each serving cell at the corresponding positions in the downlink control information format based on the mapping relationship. As shown in FIG. 3, the base station and the UE pre-agree a mapping relationship between the serving cell index and the control field index, when the UE obtains an uplink and downlink configuration from the decoded downlink control information format, it finds the corresponding control field based on the pre-agreed mapping relationship, thereby respectively obtaining the uplink and downlink configuration information corresponding to each serving cell.

Embodiment 5

For a UE having both the dynamic uplink and downlink configuration adjustment capability and the carrier aggregation capability, the base station configures that these two functions of the UE are simultaneously enabled.

When the UE has serving cells with different uplink and downlink configurations in the aggregation, the base station bears the uplink and downlink configuration information of the serving cells participating in the aggregation in the same downlink control information format, then transmits in the physical downlink control channel of the primary serving cell; or, the base station respectively bears the uplink and downlink configuration information of the serving cells participating in the aggregation in different downlink control information formats, then transmits in the physical downlink control channel corresponding to each serving cell; or, the base station bears the uplink and downlink configuration information of the serving cells participating in the aggregation into a predefined downlink control information format, and then transmits in a predefined physical downlink control channel;

Embodiment 6

In the existing protocols, the base station can support the channel state measurements of multiple serving cells or transport nodes by configuring multiple CSI-RS-configs, and the UE performs the channel state measurement in the corresponding resources (including time-frequency code resources) based on the configuration parameters. Because the channel measurement is needed to be conducted based on the CSI-RS, only when the base station indeed transmits the CSI-RS in the resources corresponding to the CSI-RS-config, that is, only when the time domain resources corresponding to the CSI-RS-config is a downlink subframe, can the UE perform a correct channel measurement in the configured CSI-RS resources.

In a system supporting the dynamic adjustment of the uplink and downlink configuration, the transmission direction of the subframe can be dynamically changed, therefore, when a subframe configured with the CSI-RS becomes an uplink subframe, and the UE re-configures the resources based on the CSI-RS to perform the CSI measurement, the CSI measured and obtained by the UE is not accurate, because the base station does not transmit the CSI-RS at all. Moreover, when the UE reports the CSI to the base station, the reported CSI may be a CSI based on a certain measurement, or an average based on the CSIs of several times, at this time, if the reported CSI is an average based on the CSIs in several measurements, but in the current mechanism, the UE is unable to judge whether the measured CSI is valid (because the UE cannot know whether the time domain resource corresponding to the CSI-RS-config is downlink), and the UE reporting the CSI is the UE's implementation behavior which is not specified at all in the protocol, thus the base station side cannot judge whether the CSI reported by the UE can truly reflect the channel state, thereby affecting the scheduling of the base station.

In the present embodiment, the base station establishes a mapping relationship between a CSI-RS-config and a TDD-index, the UE can find an uplink and downlink configuration corresponding to the CSI-RS-config based on the mapping relationship, when the UE performs a measurement based on the CSI-RS, it can first judge whether the CSI-RS is valid, and if the configured CSI-RS is an uplink subframe in the current uplink and downlink configuration, the UE may not perform the CSI measurement, thus avoiding the UE from reporting an invalid CSI.

Embodiment 7

In the existing protocols, the base station configures the multiple point coordinated transmission of the UE through a set of multiple QCL (Quasi Co-Location) configuration parameters, when the uplink and downlink configurations of multiple transport nodes are not the same, the base station establishes a mapping relationship between a QCL configuration parameter and a TDD-index, the UE can find the uplink and downlink configuration corresponding to the QCL configuration parameter based on this mapping relationship, which is also equivalent to finding an uplink and downlink configuration of the transport node corresponding to the QCL configuration parameter.

Embodiment 8

Figure 4:
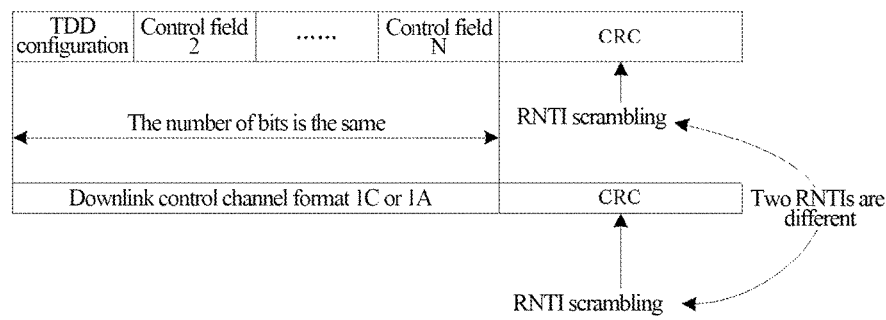
FIG. 4 is another schematic diagram in accordance with an embodiment of the present document.
Figure 5:
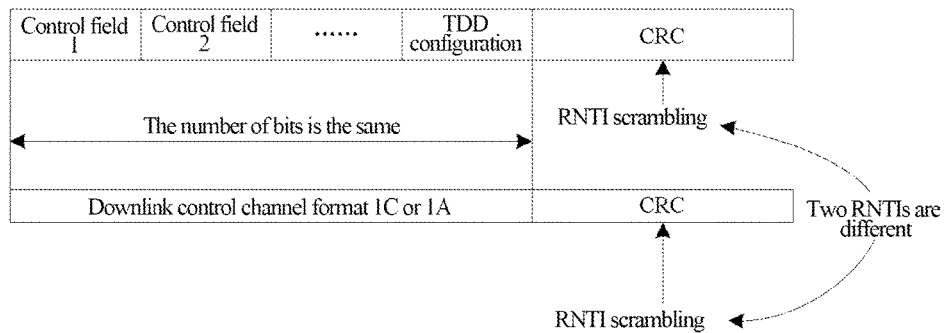
FIG. 5 is another schematic diagram in accordance with an embodiment of the present document.
Figure 6:
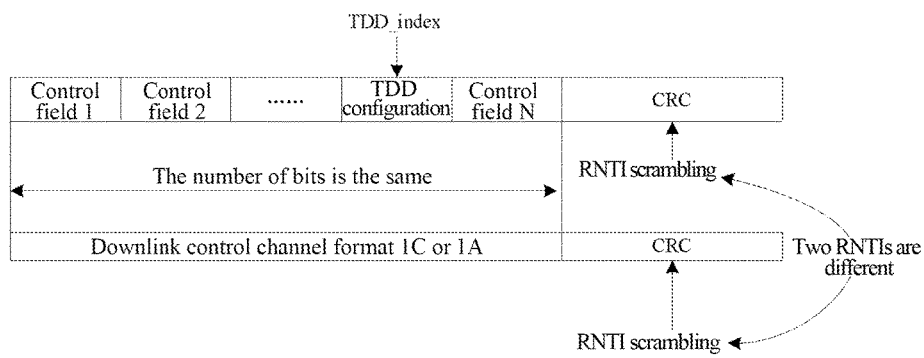
FIG. 6 is another schematic diagram in accordance with an embodiment of the present document.

In the embodiment 8, the number of bits included in the downlink control information format that bears the uplink and downlink configuration information is the same as the number of bits included in the existing downlink control information format 1A or 1C, and is called the downlink control information format 1E in the present embodiment; one or more control fields in the downlink control information format transmitted by the base station are used for indicating the uplink and downlink configuration information, the other control fields are used to indicate control information other than the uplink and downlink configuration information; wherein, the control field used for indicating the uplink and downlink configuration information can be fixed at the head of the downlink control information format as shown in FIG. 4, it may also be fixed at the end of the downlink control information format as shown in FIG. 5, and it may also be indicated through the upper layer signaling TDD-index as shown in FIG. 6. In addition, the control information carried in other control fields includes but is not limited to the following control information: power control associated control information, channel measurement associated control information, interference measurement associated control information, and sounding reference signal associated control information;

when receiving, based on the number of bits included in the downlink control information format 1E, the UE performs a blind detection on the physical downlink control channel in the candidate search space to obtain the decoded downlink control information including the CRC, and then performs descrambling and CRC check on the CRC based on the RNTI configured by the base station and used to detect the uplink and downlink configuration information, if the CRC check is passed, then further finds the uplink and downlink configuration information from the decoded downlink control information format at the predefined position or based on the TDD-index configured by the upper layer. After obtaining the uplink and downlink configuration information, from the downlink control information format, the UE also obtains the other downlink control information, such as power control associated control information, channel measurement associated control information, interference measurement associated control information, and sounding reference signal associated control information;

the present embodiment can also achieve transmitting the uplink and downlink configuration information of a UE group or the uplink and downlink configuration information of a plurality of UE groups in one downlink control information format, and the configuration implementation method thereof is the same as that in the embodiments 2 and 3. In addition, besides the uplink and downlink configuration information, the downlink control information format in the present embodiment can also carry other control information, such as power control associated control information, channel measurement associated control information, interference measurement associated control information, and sounding reference signal related control information. When the number of UEs supporting the dynamic uplink and downlink configuration adjustment is not so large, the downlink control information format carrying the uplink and downlink configuration information may also carry other control information, thus improving the capability of the downlink control information format carrying the control information.

Embodiment 9

Figure 7:
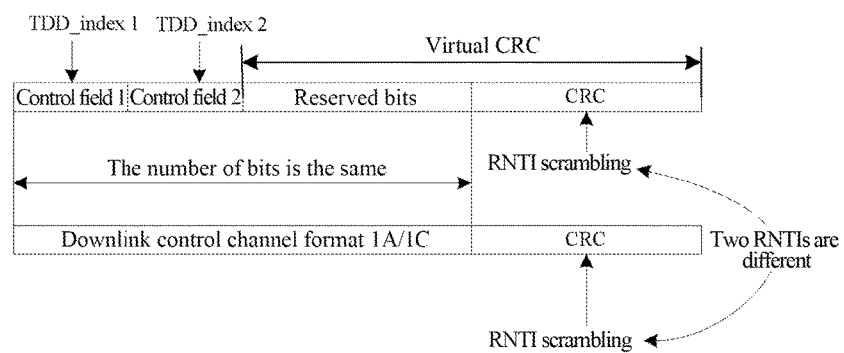
FIG. 7 is another schematic diagram in accordance with an embodiment of the present document.

In the present embodiment, the number of bits included in the downlink control information format carrying the uplink and downlink configuration information is the same as the number of bits included in the existing downlink control information format 1A or 1C, and is called the downlink control Information Format 1E in the present embodiment; one or more control fields in the downlink control information format transmitted by the base station are used for indicating the uplink and downlink configuration information, and the other control fields are reserved; as shown in FIG. 7. Wherein, the position of the control field used for indicating the uplink and downlink configuration information can be indicated through the upper layer signaling TDD-index.

When receiving, based on the number of bits included in the downlink control information format 1E, the UE performs a blind detection on the physical downlink control channel in the candidate search space to obtain the decoded downlink control information including the CRC, and then performs descrambling and CRC check on the CRC based on the RNTI configured by the base station and used to detect the uplink and downlink configuration information, and if the CRC check is passed, then it further finds the uplink and downlink configuration information from the decoded downlink control information format at the predefined position or based on the TDD-index configured by the upper layer.

The present embodiment can also achieve transmitting the uplink and downlink configuration information of one UE group or the uplink and downlink configuration information of a plurality of UE groups in a downlink control information format, and the configuration implementation method thereof is the same as that in the embodiments 2 and 3. In the downlink control information format in the present embodiment, besides the uplink and downlink configuration information can be carried, other control fields are set as reserved bits. When the number of UEs supporting the dynamic uplink and downlink configuration adjustment is not so large, and there is no other control information required to be carried, the remaining bits in the downlink control information format can be set as preset values, and the reserved bits are not used in the current system but can be reserved and used by subsequent versions of the system, thereby providing a possibility to the forward compatibility. Alternatively, the other control fields work as reserved bits and are set as preset values, the reserved bits can be used as a virtual CRC, which is equivalent to equivalently increasing the length of the CRC, thus further reducing the probability of false detection of the downlink control information format. When these reserved bits work as the virtual CRC, the base station and the UE need to agree on the number of the reserved bits as well as the positions of the reserved bits.

Embodiment 10

Figure 8:
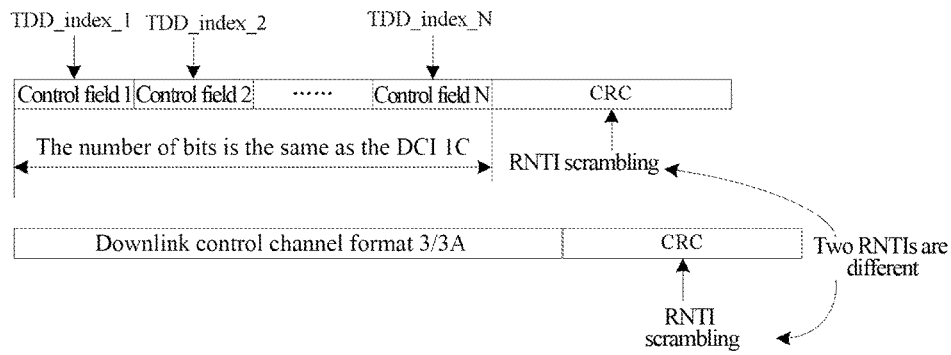
FIG. 8 is another schematic diagram in accordance with an embodiment of the present document.

In the present embodiment, the base station configures the dynamic uplink and downlink configuration adjustment specific RNTI, recorded as the TDD-RNTI, through the upper layer signaling, the configured TDD-RNTI is the same as one of the existing RNTIs configured to the UE:

it is assumed that the TDD-RNTI and the configured TPC-PUCCH-RNTI are identical, then when the number of bits included in the downlink control information format bearing the downlink configuration information is different from the number of bits included in the downlink control information format corresponding to the TPC-PUCCH-RNTI, that is, when it is not equal to the number of bits included in the downlink control information format 3/3A, for example, the number of bits included in the downlink control information format 1C is used, it is called the downlink control information format 1E in the present embodiment; as shown in FIG. 8, the downlink control information format transmitted by the base station contains a plurality of control fields, and each control field indicates one kind of uplink and downlink configuration information; at the same time, in this form, the base station also needs to configure the UE with an index value, herein recorded as a TDD-index, used for indicating the user equipment to obtain the uplink and downlink configuration information in which control field in the downlink control information format; or the TDD-index is obtained by using the method described in the embodiment 1;

when receiving, the UE performs a blind detection on the physical downlink control channel in the candidate search space according to the number of bits included in the downlink control information format 1E to obtain the decoded downlink control information containing the CRC, and then performs descrambling and CRC check on the CRC based on the RNTI configured by the base station and used to detect the uplink and downlink configuration information, namely the RNTI identical with the TPC-PUCCH-RNTI here, and if the CRC check is passed, then further finds the control field corresponding to the TDD-index from the decoded downlink control information format based on the TDD-index configured by the upper layer, thereby obtaining the corresponding uplink and downlink configuration information.

In the present embodiment, the TDD-RNTI of the UE and the TPC-PUCCH-RNTI of the UE are the same, but the numbers of bits contained in the two downlink control information formats scrambled through the CRC by using the RNTI are unequal, when the UE performs detection, the two different downlink control information formats can be distinguished through the different numbers of bits included in the different formats; and for two downlink control information formats containing the same number of bits, as in this example, both of them are the number of bits included in the format 1C, then scrambling can be performed through different RNTIs used in the CRC scrambling, for example, some are scrambled with the SI-RNTI, and some are scrambled with the TPC-PUCCH-RNTI, and when the UE performs detection, different downlink control information formats are distinguished by descrambling the CRC differently. Compared to the method described in the embodiment 1, this method can save the RNTI resource overhead, but the limits brought are that the UE group supporting the dynamic uplink and downlink configuration adjustment and the UE group for the TPC power control adjustment are bound together. In some application scenarios, such as the multipoint collaborative transmission scenario, the UE group for the TPC power adjustment under different transmission points and the UE group supporting the dynamic uplink and downlink configuration adjustment have stronger coupling, in this scenario, binding the UE group supporting the dynamic uplink and downlink configuration adjustment and the UE group supporting the TPC power adjustment is reasonable, which can save the RNTI resource overhead.

Similar to the embodiment 1, in the scenario corresponding to the embodiment 10, the alternative solutions of the specific embodiments 2-9 are equally applicable, which are not repeatedly described here.

Embodiment 11

Figure 9:
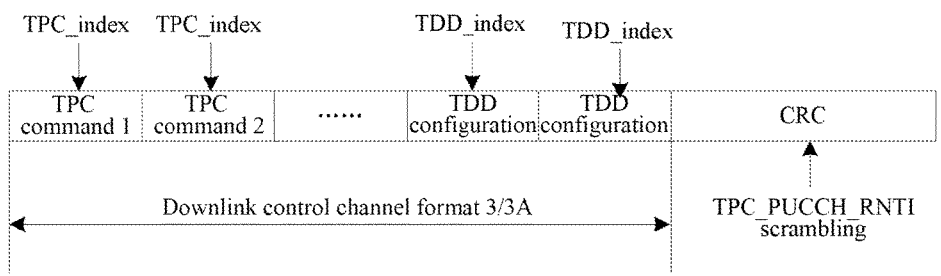
FIG. 9 is another schematic diagram in accordance with an embodiment of the present document.

For a UE having the dynamic uplink and downlink configuration adjustment function, the base station configures the dynamic uplink and downlink configuration adjustment specific RNTI, recorded as the TDD-RNTI, through the upper layer signaling, and the configured TDD-RNTI is the same as one of the existing RNTIs configured to the UE:

it is assumed that the TDD-RNTI and the configured TPC-PUCCH-RNTI are identical, and when the number of bits included in the downlink control information format bearing the downlink configuration information is also the same as the number of bits included in the downlink control information format corresponding to the TPC-PUCCH-RNTI, that is, when it is equal to the number of bits included in the downlink control information format 3/3A, as shown in FIG. 9, at this time, the downlink control information format contains the power control command information corresponding to the original TPC-PUCCH-RNTI, and also contains the uplink and downlink configuration information in the meantime, that is, the downlink control information format contains a plurality of control fields, wherein one control field is used to indicate the uplink and downlink configuration information, and the other control fields are used to indicate the existing control information. At this time, for a UE having the dynamic uplink and downlink configuration adjustment capability, the base station is required to additionally configure the UE with an index value TDD-index which is used for indicating the user equipment to obtain the uplink and downlink configuration information at which position in the downlink control message format;

when receiving, the UE performs a blind detection on the physical downlink control channel in the candidate search space based on the number of bits included in the downlink control information format 3/3A to obtain the decoded downlink control information containing the CRC, and then performs descrambling and CRC check on the CRC based on the TPC-PUCCH-RNTI, if the CRC check is passed, then further finds the uplink and downlink configuration information from the decoded downlink control information format based on the TDD-index configured by the upper layer. For a UE having the dynamic uplink and downlink configuration adjustment, besides obtaining the power control adjustment parameter in the 3/3A based on the TPC-index, it also needs to obtain the uplink and downlink configuration information based on the TDD-index.

In this way, multiplexing the power control command and the uplink and downlink configuration information can be flexibly implemented in the same downlink control information format through the base station configuration way, and multiplexing the control information of the UE of older version that does not support the dynamic uplink and downlink configuration adjustment and the control information of the UE supporting the dynamic uplink and downlink configuration adjustment also can be achieved in this way. It should be noted that, for the TPC-index, because the power control command may be 1 bit or 2 bits, when the UE obtains the power control command based on the TPC-index, it takes one or two bits as the step length to read the decoded downlink control information format, and for the uplink and downlink configuration information, it needs 3 bits to indicate, therefore, when the UE obtains the uplink and downlink configuration information based on the TDD-index, it needs to take 3 bits as the step length to read the decoded downlink control information format. When the base station transmits the 3/3A and configures the TDD-index and the TPC-index, a reasonable configuration is needed to avoid the conflict.

Similar to the embodiment 1, under the scenario corresponding to the embodiment 11, the alternative solutions of the specific embodiments 2, 3, 4, 5, 6 and 7 are equally applicable, which is not repeatedly described here.

Embodiment 12

Figure 10:
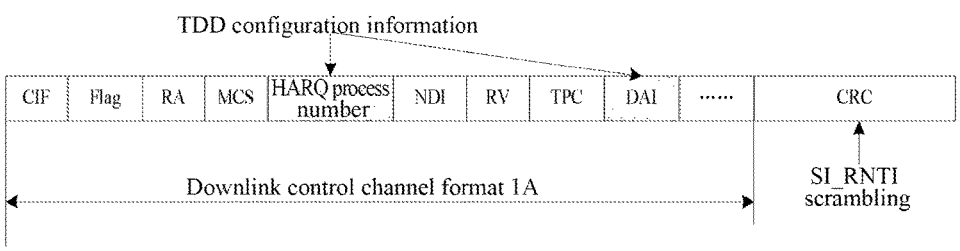
FIG. 10 is another schematic diagram in accordance with an embodiment of the present document.

In the present embodiment, the TDD-RNTI is the same as the configured SI-RNTI, and when the number of bits included in the downlink control information format bearing the uplink and downlink configuration information is the same as the number of bits included in the downlink control information format corresponding to the SI-RNTI, that is, when it is equal to the number of bits included in the downlink control information format 1A, as shown in FIG. 10, at this time, the downlink control information format contains the power control command information corresponding to the original SI-RNTI, and also contains the uplink and downlink configuration information in the meantime, that is, the downlink control information format contains a plurality of control fields, wherein one control field is used to indicate the uplink and downlink configuration information, and the other control fields are used to indicate the existing control information. At this time, the base station transmits the uplink and downlink configuration information in the reserved control fields, when the downlink control information format 1A is scrambled with the SI-RNTI, the two control fields: HARQ process number and downlink allocation index are reserved, and the base station can transmit the uplink and downlink configuration information in these two control fields.

When receiving, the UE performs a blind detection on the physical downlink control channel in the candidate search space according to the number of bits included in the downlink control information format 1A to obtain the decoded downlink control information containing the CRC, and then performs descrambling and CRC check on the CRC based on the SI-RNTI, if the CRC check is passed, then it further finds the uplink and downlink configuration information in the decoded downlink control information format in the reserved control fields, and meanwhile, it also obtains the other control information carried in the downlink control information format 1A.

In this way, the base station can spare out three bits from the existing downlink control information format to carry the uplink and downlink configuration information through certain scheduling restrictions, or carry the uplink and downlink configuration information in the control fields reserved from the existing downlink control information format under certain scenarios, so as to achieve the notification of the uplink and downlink configuration information without adding any overhead.

Similar to the embodiment 1, under the scenario corresponding to the embodiment 12, the alternative solution of the specific embodiment 2 is equally applicable, which is not repeatedly described here.

In all the embodiments of the present document, the downlink control information format carrying the uplink and downlink configuration information is transmitted through a physical downlink control channel. The physical downlink control channel may be transmitted in the common search space; or transmitted in the common search space and the specific search spaces; or in the carrier aggregation system, it is transmitted in the common search space of the primary serving cell; or transmitted in the specific search space corresponding to each serving cell and the common search space of the primary serving cell.

In the following, the method of the present document will be described from the perspectives of the base station and the user equipment respectively:

in the method for notifying the uplink and downlink configuration information in accordance with the present document, the base station sends to the User Equipment (UE) a downlink control information format that carries uplink and downlink configuration information used for indicating an uplink and downlink configuration.

That is, the downlink control information format works as a valid physical layer signaling used to bear the uplink and downlink configuration information in the present document.

Understandably, only the UE having the dynamic uplink and downlink configuration adjustment function can receive the downlink control information format carrying the uplink and downlink configuration information.

Specifically, the base station transmits the downlink control information format through the physical downlink control channel.

The Cyclic Redundancy Check (CRC) of the downlink control information format mentioned in the context is scrambled with a predefined Radio Network Temporary Identifier (RNTI), wherein, the predefined RNTI is a specific RNTI of a UE having the dynamic uplink and downlink configuration adjustment function or an existing RNTI, and the existing RNTI includes but is not limited to System Information (SI) RNTI (SI-RNTI), Paging (P) RNTI (P-RNTI), Random Access (RA) RNTI (RA-RNTI), Transmit Power Command (TPC) RNTI (including TPC-PUCCH-RNTI, TPC-PUSCH-RNTI), and Cell (C) RNTI (C-RNTI).

Alternatively, the base station notifies the UE to detect the uplink and downlink configuration information based on the RNTI in one of the following ways:

way 1: notifying through an upper-layer signaling;

way 2: configuring a user equipment-specific transmission mode;

way 3: entering the dynamic uplink and downlink configuration adjustment mode by activating the user equipment;

alternatively, the base station can configure a plurality of user equipments with the same dynamic uplink and downlink configuration adjustment specific RNTI.

Preferably, the number of bits contained in the downlink control information format in the present document is equal to the number of bits contained in one of the existing defined downlink control information formats, thereby avoiding an increase in the number of blind detections on the physical downlink control information format.

The downlink control information format contains a plurality of control fields, wherein at least one control field is used to carry the uplink and downlink configuration information.

Preferably, the downlink control information format uses one of the following forms:

form 1: the downlink control information format contains a plurality of control fields, wherein each control field indicates one uplink and downlink configuration;

at least one control field in the downlink control information format is used to carry the uplink and downlink configuration information, and at least one control field is used to indicate the existing control information or indicate the newly-added control information or set as a predefined value. Preferably, any one of the following forms 2 to 4 can be used:

form 2: the downlink control information format contains a plurality of control fields, wherein one or more control fields are used to indicate the uplink and downlink configuration information, the other control fields are used to indicate control information (such as the newly-added control information) other than the uplink and downlink configuration information;

form 3: the downlink control information format contains a plurality of control fields, wherein one control field is used to indicate the uplink and downlink configuration information, the other control fields are used to indicate the existing control information;

form 4: the downlink control information format contains a plurality of control fields, wherein one or more control fields are used to indicate the uplink and downlink configuration information, the other control fields are set as predefined state values.

Furthermore, the uplink and downlink configuration information may be the uplink and downlink configuration information (in the carrier aggregation scenario) of one or more serving cells of the UE, or the uplink and downlink configuration information of one or more transport nodes (in the coordinated multi-point (CoMP) transmission mode) within the serving cells of the UE, or may also be the uplink and downlink configuration information of the neighboring cells (other cells except the serving cells of the UE) of the UE.

Preferably, in the carrier aggregation system, the base station bears the uplink and downlink configuration information of serving cells participating in the aggregation in the same downlink control information format, and transmits the downlink control information format through the physical downlink control channel of the primary serving cell; or, the base station respectively bears the uplink and downlink configuration information of the serving cells participating in the aggregation in different downlink control information formats, and respectively transmits in the physical downlink control channel corresponding to each serving cell; or, the base station bears the uplink and downlink configuration information of the serving cells participating in the aggregation in a predefined downlink control information format, and transmits in the predefined physical downlink control channel.

Furthermore, the position of the uplink and downlink configuration information in the downlink control information format can be determined in any one of the following ways:

determined through the upper layer signaling; or determined in a predefined way; or determined based on a mapping relationship with an index of the serving cell; or determined based on a mapping relationship with a carrier indication control field (CIF); or determined based on a mapping relationship with the CSI-RS-Config configuration parameter; or determined based on a mapping relationship with the Quasi Co-Location (QCL) configuration parameter;

the control information other than the uplink and downlink configuration information includes but is not limited to the following control information: power control associated control information, channel measurement associated control information, interference measurement associated control information, and sounding reference signal associated control information;

preferably, each control field contains 3 bits, the other bits (fewer than 3 bits) are reserved, the 3 bits of each control field correspond to one of the seven existing uplink and downlink configurations in the time division duplexing system.

Furthermore, the physical downlink control channel may be transmitted in the common search space; or transmitted in the common search space and the specific search spaces; or in the carrier aggregation system, it is transmitted in the common search space of the primary serving cell; or transmitted in the specific search space corresponding to each serving cell and the common search space of the primary serving cell.

The method for notifying the uplink and downlink configuration information in the present document is described above from the perspective of the base station, and in the following, the method for obtaining the uplink and downlink configuration information in the present document will be described from the perspective of the user equipment (UE) side.

Figure 11:
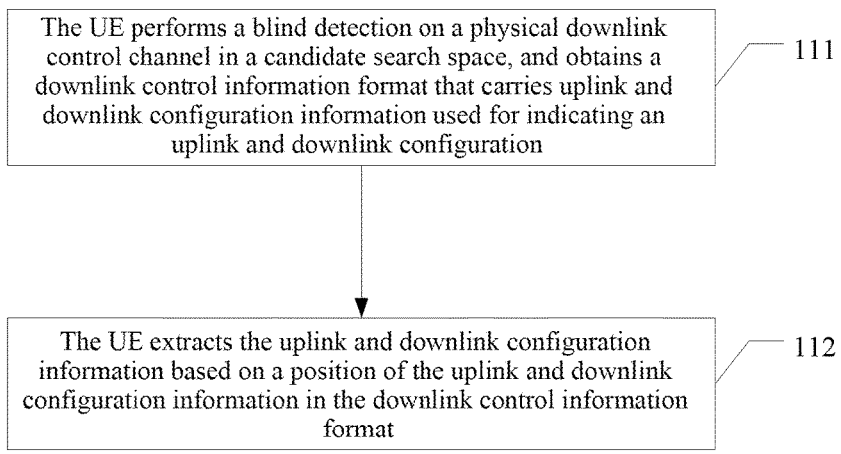
FIG. 11 is a schematic diagram of a method for obtaining uplink and downlink configuration information in accordance with the embodiment of the present document.

The method for obtaining the uplink and downlink configuration information in the present document is as shown in FIG. 11, and the method includes the following steps:

in step 111: the user equipment (UE) performs a blind detection on a physical downlink control channel in a candidate search space, and obtains the downlink control information format that carries the uplink and downlink configuration information used for indicating an uplink and downlink configuration;

alternatively, the candidate search space can be the common search space; or the common search space and the specific search spaces; or in the carrier aggregation, it is the common search space of the primary serving cell, or the specific search space corresponding to each servicing cell and the public search space of the primary serving cell.

The number of bits contained in the downlink control information format carrying the uplink and downlink configuration information is equal to the number of bits contained in one of the existing defined downlink control information formats.

When the UE performs a blind detection, it also needs to rely on the RNTI, the RNTI is a dynamic uplink and downlink configuration adjustment specific RNTI configured by the base station to the user equipment through the upper-layer signaling; or, the RNTI that the UE already has and is used to detect the uplink and downlink configuration information, and the RNTI includes but is not limited to the SI-RNTI, P-RNTI, RA-RNTI, TPC-PUCCH-RNTI, TPC-PUSCH-RNTI, and C-RNTI.

In step 112: the UE extracts the uplink and downlink configuration information based on the position of the uplink and downlink configuration information in the downlink control information format.

The position of the uplink and downlink configuration information in the downlink control information format is determined in at least one of the following ways:

the UE can determine through the upper-layer signaling; or determine in a predefined way; or determine based on a mapping relationship with an index of the serving cell;

or determine based on a mapping relationship with a carrier indication control field (CIF); or determine based on a mapping relationship with the CSI-RS-Config configuration parameter; or determined based on a mapping relationship with the QCL upper-layer configuration parameter.

Preferably, the position of the uplink and downlink configuration information in the downlink control information format refers to the index value of the control field in the downlink control information format.

Figure 12:
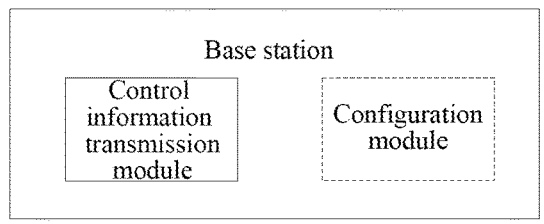
FIG. 12 is a schematic diagram of a modular structure of a base station in accordance with the embodiment of the present document.

Preferably, in the carrier aggregation scenario, the uplink and downlink configuration information of all the serving cells participating in the aggregation is borne in the same downlink control information format; or in the carrier aggregation scenario, the uplink and downlink configuration information of all the serving cells participating in the aggregation is borne in different downlink control information formats; or in the carrier aggregation scenario, the uplink and downlink configuration information of the serving cells participating in the aggregation is borne in the downlink control information format corresponding to each serving cell;

alternatively, after obtaining the uplink and downlink configuration information, the UE also obtains from the downlink control information format the other downlink control information, specifically including: power control associated control information, channel measurement associated control information, interference measurement associated control information, and sounding reference signal associated control information;

in order to achieve the abovementioned method, the present document also provides a base station, as shown in FIG. 12, the base station includes:

a control information transmission module, used to: send to a user equipment (UE) a downlink control information format that carries uplink and downlink configuration information used for indicating an uplink and downlink configuration.

Alternatively, the base station also includes: a configuration module, used to configure the RNTI, and the uplink and downlink configuration specific radio network temporary identifiers (RNTIs) configured for a plurality of UEs are the same.

Furthermore, the downlink control information format contains a plurality of control fields, wherein at least one control field is used to carry the uplink and downlink configuration information.

Preferably, each control field indicates one uplink and downlink configuration.

Alternatively, at least one control field in the downlink control information format is used to indicate the existing control information or used to indicate the newly-added control information or set as a predefined value.

The position of the uplink and downlink configuration information in the downlink control information format is determined in any one of the following ways:

determined through the upper-layer signaling; or determined in a predefined way; or determined based on a mapping relationship with an index of the serving cell; or determined based on a mapping relationship with the carrier indication control field (CIF); or determined based on a mapping relationship with the CSI-RS-Config configuration parameter; or determined based on a mapping relationship with the QCL configuration parameter.

Preferably, the position of the uplink and downlink configuration information in the downlink control information format refers to the index value of the control field in the downlink control information format.

Figure 13:
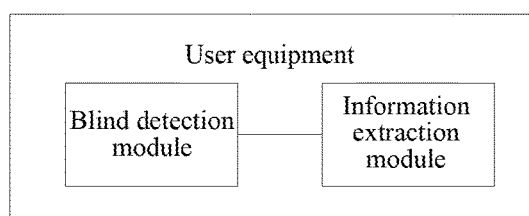
FIG. 13 is a schematic diagram of a modular structure of a user equipment in accordance with the embodiment of the present document.

In order to solve the abovementioned technical problem, the present document also provides a user equipment, as shown in FIG. 13, the user equipment includes:

a blind detection module, used to perform a blind detection on a physical downlink control channel in a candidate search space to obtain the downlink control information format that carries uplink and downlink configuration information used for indicating an uplink and downlink configuration;

an information extraction module, used to extract the uplink and downlink configuration information based on the position of the uplink and downlink configuration information in the downlink control information format.

The position of the uplink and downlink configuration information in the downlink control information format is determined in at least one of the following ways:

determined through the upper layer signaling; or determined in a predefined way; or determined based on the mapping relationship with an index of the serving cell; or determined based on the mapping relationship with the carrier indication control field (CIF); or determined based on the mapping relationship with the CSI-RS-Config upper-layer configuration parameter; or determined based on the mapping relationship with the QCL configuration parameter.

Preferably, the position of the uplink and downlink configuration information in the downlink control information format refers to the index value of the control field in the downlink control information format.

Preferably, in the carrier aggregation scenario, the uplink and downlink configuration information of all the serving cells participating in the aggregation is borne in the same downlink control information format; or in the carrier aggregation scenario, the uplink and downlink configuration information of all the serving cells participating in the aggregation is borne in different downlink control information formats; or, in the carrier aggregation scenario, the uplink and downlink configuration information of the serving cells participating in the aggregation is borne in the downlink control information format corresponding to each serving cell.

The above description is only the preferred embodiments of the present document and is not intended to limit the protection scope of the present document. Any modifications, equivalent replacements and improvements made within the spirit and principle of the present document should be included in the protection scope of the present document.

INDUSTRIAL APPLICABILTY

The method for notifying and obtaining uplink/downlink configuration information, as well as the base station and the user equipment in accordance with the embodiment of the present document use the downlink control information format to carry uplink/downlink configuration information used for indicating the uplink/downlink configuration, which achieves the purpose of quickly notifying the user equipment of the uplink/downlink configuration used by the present cell without taking up extra physical layer resources, has small delay, and does not have the ambiguity problem.

What is claimed is:

1. A method for notifying uplink and downlink configuration information, comprising:
   a base station sending to a user equipment (UE) a downlink control information format, wherein the downlink control information format carries uplink and downlink configuration information used for indicating an uplink and downlink configuration,
   wherein, a position of the uplink and downlink configuration information in the downlink control information format is determined in any one of the following ways:
   determined through an upper layer signaling; or
   determined in a predefined way; or
   determined based on a mapping relationship with an index of a serving cell; or
   determined based on a mapping relationship with a carrier indication control field (CIF); or
   determined based on a mapping relationship with a configuration parameter of a reference signal used for acquiring channel state information (CSI-RS-Config); or
   determined based on a mapping relationship with a quasi co-location (QCL) configuration parameter,
   wherein, the position of the uplink and downlink configuration information in the downlink control information format is an index indicating the UE to obtain the uplink and downlink configuration information in which control field in the downlink control information format.

2. The method of claim 1, further comprising: before sending the downlink control information format, the base station being further used to configure a radio network temporary identifier (RNTI), and the base station configuring a plurality of UEs with same or different uplink and downlink configuration-specific RNTIs.

3. The method of claim 1, further comprising: the base station notifying the UE to perform uplink and downlink configuration information detection based on the RNTI in one of the following ways:
   notifying through an upper layer signaling;
   configuring a UE-specific transmission mode;
   activating the UE to enter a dynamic uplink and downlink configuration adjustment mode.

4. The method of claim 1, wherein, the downlink control information format comprises a plurality of control fields, wherein at least one control field is used for carrying the uplink and downlink configuration information.

5. The method of claim 4, wherein, each control field indicates one uplink and downlink configuration,
   or,
   wherein, at least one control field in the downlink control information format is used for indicating existing control information or used for indicating newly-added control information or set as a predefined value.

6. The method of claim 1, wherein, the uplink and downlink configuration information is at least one of the following:
   uplink and downlink configuration information of one or more serving cells of the UE;
   uplink and downlink configuration information of one or more transport nodes within a serving cell of the UE;
   uplink and downlink configuration information of neighbor serving cells of the serving cell of the UE,
   or,
   wherein, in a carrier aggregation system:
   uplink and downlink configuration information of all serving cells participating in an aggregation is borne in a same downlink control information format, and is transmitted via a physical downlink control channel of a primary serving cell;
   or, uplink and downlink configuration information of all serving cells participating in an aggregation is respectively borne in different downlink control information formats, and is transmitted through a physical downlink control channel corresponding to each serving cell;
   or, uplink and downlink configuration information of all serving cells participating in an aggregation is borne in a predefined downlink control information format, and is transmitted in a predefined physical downlink control channel, or,
wherein, the base station sends the downlink control information format through a physical downlink control channel, the physical downlink control channel is transmitted in a common search space; or transmitted in a common search space and a specific search space; or transmitted in a common search space of a primary serving cell in a carrier aggregation system; or transmitted in a specific search space corresponding to each serving cell and the common search space of the primary serving cell.

7. The method of claim 1, wherein, the base station configures a plurality of UEs with same or different index values of control fields.

8. A method for obtaining uplink and downlink configuration information, comprising:
a user equipment (UE) performing a blind detection on a physical downlink control channel in a candidate search space, and obtaining a downlink control information format, wherein the downlink control information format carries uplink and downlink configuration information used for indicating an uplink and downlink configuration;
the UE extracting the uplink and downlink configuration information based on a position of the uplink and downlink configuration information in the downlink control information format,
wherein, the position of the uplink and downlink configuration information in the downlink control information format is determined in at least one of the following ways:
determined through an upper layer signaling; or
determined in a predefined way; or determined based on a mapping relationship with an index of a serving cell; or
determined based on a mapping relationship with a carrier indication control field (CIF); or
determined based on a mapping relationship with a configuration parameter of a reference signal used for acquiring channel state information (CSI-RS-Config), or
determined based on a mapping relationship with a quasi co-location (QCL) configuration parameter,
wherein, the position of the uplink and downlink configuration information in the downlink control information format is an index indicating the UE to obtain the uplink and downlink configuration information in which control field in the downlink control information format.

9. The method of claim 8, wherein, in a carrier aggregation scenario, uplink and downlink configuration information of all serving cells participating in an aggregation is borne in a same downlink control information format; or, in a carrier aggregation scenario, uplink and downlink configuration information of all serving cells participating in an aggregation is respectively borne in different downlink control information formats; or, in a carrier aggregation scenario, uplink and downlink configuration information of serving cells participating in an aggregation is carried in a downlink control information format corresponding to each serving cell,
or,
wherein, the candidate search space is a common search space; or a common search space and a specific search space; or in a carrier aggregation, a common search space of a primary serving cell, or a specific search space corresponding to each servicing cell and the common search space of the primary serving cell.

10. A base station, comprising hardware performing instructions stored in a non-transitory computer readable medium which executes the following step:
sending to a user equipment (UE) a downlink control information format, wherein the downlink control information format carries uplink and downlink configuration information used for indicating an uplink and downlink configuration,
wherein, a position of the uplink and downlink configuration information in the downlink control information format is determined in any one of the following ways:
determined through an upper layer signaling; or
determined in a predefined way; or determined based on a mapping relationship with an index of a serving cell; or
determined based on a mapping relationship with a carrier indication control field (CIF); or
determined based on a mapping relationship with a configuration parameter of a reference signal used for acquiring channel state information (CSI-RS-Config),
wherein, the position of the uplink and downlink configuration information in the downlink control information format is an index indicating the UE to obtain the uplink and downlink configuration information in which control field in the downlink control information format.

11. The base station of claim 10, the hardware further executes following steps: configuring a radio network temporary identifier (RNTI), and configuring a plurality of UEs with same or different uplink and downlink configuration-specific RNTIs,
or,
wherein, the downlink control information format comprises a plurality of control fields, wherein at least one control field is used to carry the uplink and downlink configuration information.

12. The base station of claim 10, wherein, each control field indicates one uplink and downlink configuration.

13. The base station of claim 12, wherein, at least one control field in the downlink control information format is used for indicating existing control information or used for indicating newly-added control information or set as a predefined value.

14. A user equipment, comprising a processor performing instructions stored in a memory which executes the following steps:
performing a blind detection on a physical downlink control channel in a candidate search space, and obtaining a downlink control information format, wherein the downlink control information format carries uplink and downlink configuration information used for indicating an uplink and downlink configuration;
extracting the uplink and downlink configuration information based on a position of the uplink and downlink configuration information in the downlink control information format,
wherein, the position of the uplink and downlink configuration information in the downlink control information format is determined in at least one of the following ways:
determined through an upper layer signaling; or
determined in a predefined way; or determined based on a mapping relationship with an index of a serving cell; or determined based on a mapping relationship with a carrier indication control field (CIF); or determined based on a mapping relationship with a configuration parameter of a reference signal used for acquiring channel state information (CSI-RS-Config), or determined based on a mapping relationship with a quasi co-location (QCL) configuration parameter, wherein, the position of the uplink and downlink configuration information in the downlink control information format is an index indicating the UE to obtain the uplink and downlink configuration information in which control field in the downlink control information format.

15. The user equipment of claim 14, wherein, in a carrier aggregation scenario, uplink and downlink configuration information of all serving cells participating in an aggregation is borne in a same downlink control information format; or in a carrier aggregation scenario, uplink and downlink configuration information of all serving cells participating in an aggregation is borne in different downlink control information formats; or, in a carrier aggregation scenario, uplink and downlink configuration information of serving cells participating in an aggregation is borne in a downlink control information format corresponding to each serving cell.

* * * * *